US012770909B2

(12) United States Patent
Ogura et al.

(10) Patent No.: US 12,770,909 B2
(45) Date of Patent: Oct. 20, 2026

(54) RECHARGEABLE BATTERY

(71) Applicants: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Masaya Ogura, Hamamatsu (JP); Shota Uchiyama, Kosai (JP); Hiroaki Ikeda, Toyota (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 757 days.

(21) Appl. No.: 18/129,039

(22) Filed: Mar. 30, 2023

(65) Prior Publication Data

US 2023/0318014 A1 Oct. 5, 2023

(30) Foreign Application Priority Data

Apr. 4, 2022 (JP) ................................ 2022-062478

(51) Int. Cl.
*H01M 10/04* (2006.01)
*H01M 50/46* (2021.01)
*H01M 50/533* (2021.01)

(52) U.S. Cl.
CPC ....... *H01M 10/0431* (2013.01); *H01M 50/46* (2021.01); *H01M 50/533* (2021.01)

(58) Field of Classification Search
CPC . H01M 10/0431; H01M 50/533; H01M 50/46
See application file for complete search history.

(56) References Cited

FOREIGN PATENT DOCUMENTS

| | | | |
|---|---|---|---|
| JP | 2020057587 A | * | 4/2020 |
| JP | 2021-089857 A | | 6/2021 |

OTHER PUBLICATIONS

English Machine Translation of Jp 2020057587A; Sakai; Apr. 9, 2020.*

* cited by examiner

*Primary Examiner* — Dah-Wei D. Yuan
(74) *Attorney, Agent, or Firm* — Maschoff Brennan

(57) ABSTRACT

To provide a rechargeable battery that limits damage to a separator, a positive connector is configured to be bent at an acute angle in a thickness-wise direction in a bending region, which is defined between a first position and a second position, on a boundary position between a flat surface region and a second position in a longitudinal direction. The first position is a position at which a second distal end of a negative plate is disposed. The second position is a position separated from a third position, at which a first distal end of a separator is disposed, by a thickness of a positive mixture layer in a second width-wise direction.

4 Claims, 4 Drawing Sheets

RECHARGEABLE BATTERY

BACKGROUND

1. Field

The following description relates to a rechargeable battery, more specifically, a rechargeable battery including an electrode body in which a negative plate, a positive plate, and a separator are stacked and rolled.

2. Description of Related Art

Japanese Laid-Open Patent Publication No. 2020-57587 discloses an example of a rechargeable battery that includes an electrode body in which a negative plate, a positive plate, and a separator are stacked in a stacking direction and rolled in a rolling direction. The electrode body is flat and includes regions in the rolling direction. The regions include a flat surface region, which includes a flat surface in the stacking direction, and a curved surface region, which includes a curved surface in the stacking direction.

The electrode body further includes a positive connector and a negative connector. The positive plate includes a positive substrate, which is exposed from the separator in the positive connector. The negative plate includes a negative substrate, which is exposed from the separator in the negative connector. The positive connector is disposed at one end of the electrode body in a width-wise direction. The negative connector is disposed at the other end of the electrode body in the width-wise direction.

When the electrode body is rolled, the positive connector and the negative connector are stacked in the stacking direction. Thus, the positive connector has stacked multiple layers, and the multiple layers are gathered and connected to a positive current collector. Also, the negative connector has stacked multiple layers, and the multiple layers are gathered and connected to a negative current collector.

With the invention disclosed in Japanese Laid-Open Patent Publication No. 2020-57587, the separator is held by the positive plate and the negative plate may be damaged on a boundary position between the flat surface region and the curved surface region.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure includes a rechargeable battery that includes an electrode body including a positive plate, a negative plate, and a separator disposed between the negative plate and the positive plate. The positive plate includes a positive substrate and positive mixture layers disposed on two opposite surfaces of the positive substrate. When the positive plate, the negative plate, and the separator are stacked in a stacking direction, the electrode body is rolled in a rolling direction that intersects the stacking direction and includes a region in the rolling direction, the region including a flat surface region including a flat surface in the stacking direction and a curved surface region including a curved surface in the stacking direction. The positive plate includes a positive connector disposed in a first width-wise direction in a width-wise direction that intersects the stacking direction and the rolling direction, the positive connector being defined by a portion of the positive substrate where the two opposite surfaces are free of the positive mixture layers. The electrode body is configured so that at least a portion of the positive connector does not face the negative plate, a distal end of the separator in the first width-wise direction projects beyond a distal end of the negative plate in the first width-wised direction, and the flat surface region includes a positive connection region in which the positive connector is connected to a positive current collector. The positive connector is configured to be bent at an acute angle in the stacking direction in a region between a first position and a second position on a boundary position between the flat surface region and the curved surface region in the rolling direction. The first position refers to a position at which the distal end of the negative plate in the first width-wise direction is located. The second position refers to a position separated, in a second width-wise direction that is opposite to the first width-wise direction, from a position at which the distal end of the separator in the first width-wise direction is located by an amount corresponding to a thickness of the positive mixture layer disposed on a surface of the positive substrate.

Another aspect of the present disclosure is a rechargeable battery that includes an electrode body including a positive plate, a negative plate, and a separator disposed between the negative plate and the positive plate. The positive plate includes a positive substrate and positive mixture layers disposed on two opposite surfaces of the positive substrate. When the positive plate, the negative plate, and the separator are stacked in a stacking direction, the electrode body is rolled in a rolling direction that intersects the stacking direction and includes a region in the rolling direction, the region including a flat surface region including a flat surface in the stacking direction and a curved surface region including a curved surface in the stacking direction. The positive plate includes a positive connector disposed in a first width-wise direction in a width-wise direction that intersects the stacking direction and the rolling direction, the positive connector being defined by a portion of the positive substrate where the two opposite surfaces are free of the positive mixture layers. The electrode body is configured so that at least a portion of the positive connector does not face the negative plate, a distal end of the separator in the first width-wise direction projects beyond a distal end of the negative plate in the first width-wised direction, and the flat surface region includes a positive connection region in which the positive connector is connected to a positive current collector. The positive connector is configured to be bent at an acute angle in the stacking direction in a region between a first position and a second position on a boundary position between the flat surface region and the curved surface region in the rolling direction. The first position refers to a position separated, in the first width-wise direction, from a position at which the distal end of the negative plate in the first width-wise direction is located by an amount corresponding to a thickness of the separator. The second position refers to a position separated, in a second width-wise direction that is opposite to the first width-wise direction, from a position at which the distal end of the separator in the first width-wise direction is located by an amount corresponding to a thickness of the positive mixture layer disposed on a surface of the positive substrate.

The rechargeable battery described above may include a nonaqueous electrolyte and a battery case accommodating the electrode body and the nonaqueous electrolyte. The positive connector may be configured to be curved in the first width-wise direction at a connection position extending from the positive connection region in the width-wise direction.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A rechargeable battery according to one embodiment will now be described.

Lithium-Ion Rechargeable Battery 10

The structure of the lithium-ion rechargeable battery of the present embodiment will be described.

Figure 1:
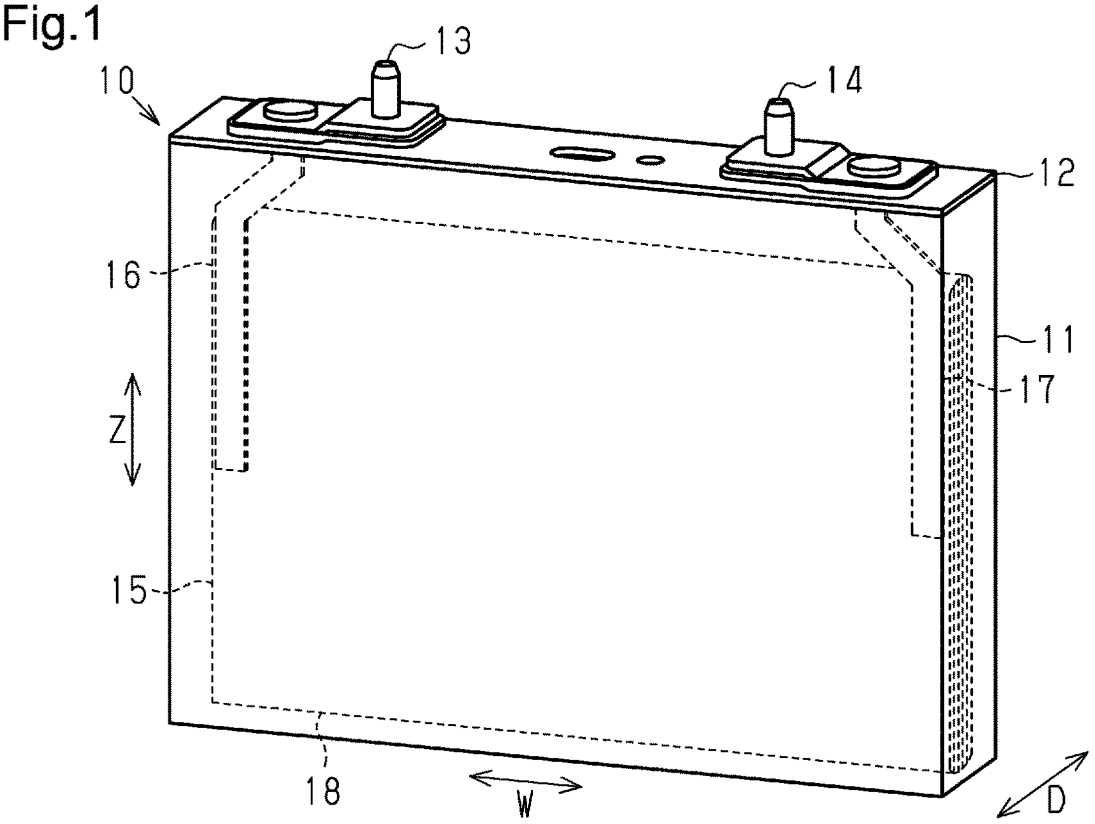
FIG. 1 is a perspective view showing a lithium-ion rechargeable battery of an embodiment.

As shown in FIG. 1, a lithium-ion rechargeable battery 10 includes a cell battery. The lithium-ion rechargeable battery 10 includes a battery case 11 and a lid 12. The battery case 11 includes an upper opening (not shown). The lid 12 seals the opening of the battery case 11. The battery case 11 and the lid 12 are formed from metal such as an aluminum alloy. The lid 12 includes a negative external terminal 13 and a positive external terminal 14 used when charging and discharging power. The negative external terminal 13 and the positive external terminal 14 may have any shape.

The lithium-ion rechargeable battery 10 includes an electrode body 15. The lithium-ion rechargeable battery 10 includes a negative current collector 16 and a positive current collector 17. The negative current collector 16 connects a negative electrode of the electrode body 15 and the negative external terminal 13. The positive current collector 17 connects a positive electrode of the electrode body 15 to the positive external terminal 14. The electrode body 15 is accommodated in the battery case 11.

The lithium-ion rechargeable battery 10 includes a nonaqueous electrolyte 18. The nonaqueous electrolyte 18 is added into the battery case 11 from a liquid inlet (not shown). In the lithium-ion rechargeable battery 10, when the lid 12 is attached to the battery case 11, a hermetic battery container is formed. Thus, the battery case 11 accommodates the electrode body 15 and the nonaqueous electrolyte 18.

Nonaqueous Electrolyte 18

The nonaqueous electrolyte 18 is a composition in which a nonaqueous solvent contains a supporting salt. In the present embodiment, ethylene carbonate (EC) may be used as the nonaqueous solvent. The nonaqueous solvent may be one or more materials selected from a group of propylene carbonate (PC), diethyl carbonate (DEC), dimethyl carbonate (DMC), ethyl methyl carbonate (EMC), and the like.

The supporting salt may be, for example, $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, or LiI. Moreover, the supporting salt may be one or more types of lithium compound (lithium salt) selected from the above compounds. Thus, the nonaqueous electrolyte 18 contains a lithium compound.

Electrode Body 15

Figure 2:
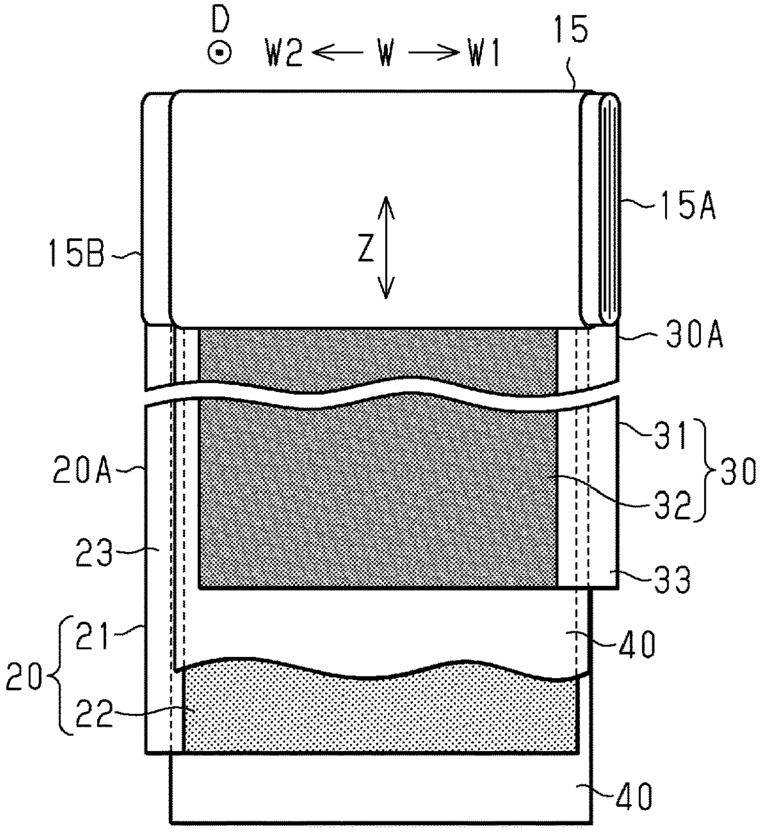
FIG. 2 is a schematic diagram showing the structure of a lamination of an electrode body of the lithium-ion rechargeable battery.

As shown in FIG. 2, the electrode body 15 includes a negative plate 20, a positive plate 30, and a separator 40. The longitudinal direction of the electrode body 15 is referred to as "the longitudinal direction Z". The thickness-wise direction of the electrode body 15 is referred to as "the thickness-wise direction D". A direction orthogonal to the longitudinal direction Z and the thickness-wise direction D of the electrode body 15 is referred to as "the width-wise direction W". The width-wise direction W includes "the first width-wise direction W1" extending to one side and "the second width-wise direction W2" extending to the other side. That is, the second width-wise direction W2 and the first width-wise direction W1 are opposite directions. In other words, the first width-wise direction W1 refers to a first side extending toward a first end of the electrode body 15 in the width-wise direction W of the electrode body 15, and the second width-wise direction W2 refers to a second side extending toward a second end, which is opposite to the first end of the electrode body 15 in the width-wise direction W of the electrode body 15.

In the electrode body 15, the negative plate 20, the positive plate 30, and the separator 40 are stacked in the thickness-wise direction D. In the electrode body 15, the separator 40 is stacked between the negative plate 20 and the positive plate 30. More specifically, in the electrode body 15, the separator 40, the positive plate 30, the separator 40, and the negative plate 20 are stacked in this order.

In the electrode body 15, the negative plate 20, the positive plate 30, and the separator 40 are stacked in the thickness-wise direction D and rolled in the longitudinal direction Z. The center of the electrode body 15 in the longitudinal direction Z is flat in the thickness-wise direction D.

The thickness-wise direction D, in which the negative plate 20, the positive plate 30, and the separator 40 are stacked, may also be referred to as a stacking direction. Also, the longitudinal direction Z, in which the negative plate 20, the positive plate 30, and the separator 40 are rolled, may be referred to as a rolling direction.

Negative Plate 20

The negative plate 20 is an example of the negative electrode of the lithium-ion rechargeable battery 10. The negative plate 20 includes a negative substrate 21 and a negative mixture layer 22. The negative mixture layer 22 is disposed on each of two opposite surfaces of the negative substrate 21.

The negative substrate 21 includes a negative connector 23. The negative connector 23 is a region in which the two surfaces of the negative substrate 21 are free of the negative mixture layer 22. The negative connector 23 is disposed at an end of the electrode body 15 in the second width-wise direction W2. Thus, the negative plate 20 includes a first distal end 20A in the second width-wise direction W2, defining a second distal end 15B of the electrode body 15 in the second width-wise direction W2.

The negative connector 23 is exposed from the separator 40 in the second width-wise direction W2. In the present embodiment, the negative connector 23 entirely does not face the positive plate 30 and partially does not face the separator 40. Alternatively, for example, the negative connector 23 may be configured so that the negative connector 23 partially does not face the positive plate 30. Thus, at least a portion of the negative connector 23 does not face the positive plate 30 and the separator 40.

In the present embodiment, the negative substrate 21 is formed of a copper (Cu) foil. The negative substrate 21 is the base for an aggregate of the negative mixture layer 22. The negative substrate 21 is also used as a current collecting member that collects electricity from the negative mixture layer 22.

The negative mixture layer 22 includes a negative active material. In the present embodiment, the negative active material is a material capable of storing and releasing lithium ions and is powder of a carbon material such as graphite. The negative plate 20 is formed by, for example, mixing the negative active material, solvent, and binder, applying the mixed negative composite to the negative substrate 21, and drying the negative composite.

Positive Plate 30

The positive plate 30 is an example of the positive electrode of the lithium-ion rechargeable battery 10. The positive plate 30 includes a positive substrate 31 and a positive mixture layer 32. The positive mixture layer 32 is disposed on each of two opposite surfaces of the positive substrate 31.

The positive substrate 31 includes a positive connector 33. The positive connector 33 is a region in which the two surfaces of the positive substrate 31 are free of the positive mixture layer 32. The positive connector 33 is disposed at an end of the electrode body 15 in the first width-wise direction W1. Thus, the positive plate 30 includes a first distal end 30A in the first width-wise direction W1, defining a first distal end 15A of the electrode body 15 in the first width-wise direction W1.

The positive connector 33 is exposed from the separator 40 in the first width-wise direction W1. In the present embodiment, the positive connector 33 partially does not face the negative plate 20 and the separator 40. Alternatively, for example, the positive connector 33 may be configured so that the positive connector 33 entirely does not face the negative plate 20. Thus, at least a portion of the positive connector 33 does not face the negative plate 20 and the separator 40.

In the present embodiment, the positive substrate 31 is formed of an aluminum (Al) foil or an Al alloy foil. The positive substrate 31 is the base for an aggregate of the positive mixture layer 32. The positive substrate 31 is also used as a current collecting member that collects electricity from the positive mixture layer 32.

The positive mixture layer 32 include a positive active material. The positive active material is a material capable of storing and releasing lithium and is, for example, lithium cobalt oxide ($LiCoO_2$), lithium manganese oxide ($LiMn_2O_4$), or lithium nickel oxide ($LiNiO_2$). Further, $LiCoO_2$, $LiMn_2O_4$, and $LiNiO_2$ may be mixed in any proportion. The positive mixture layer 32 include a conductive material. Examples of the conductive material include acetylene black (AB), carbon black such as Ketjenblack (registered trademark), and graphite. The positive plate 30 is formed by, for example, mixing the positive active material, the conductive material, solvent, and binder, applying the mixed positive composite to the positive substrate 31, and drying the positive composite.

Separator 40

The separator 40 is disposed between the negative plate 20 and the positive plate 30. The separator 40 retains the nonaqueous electrolyte 18. The separator 40 is a non-woven cloth of polypropylene, which is a porous resin, or the like. As the separator 40, a porous polymer film such as a porous polyethylene film, a porous polyolefin film, or a porous polyvinyl chloride film and a lithium-ion-conductive or ion-conductive polymer electrolyte membrane may be used alone or in combination. When the electrode body 15 is immersed into the nonaqueous electrolyte 18, the nonaqueous electrolyte 18 permeates from ends of the separator 40 toward the center.

Region of Electrode Body 15

Figure 3:
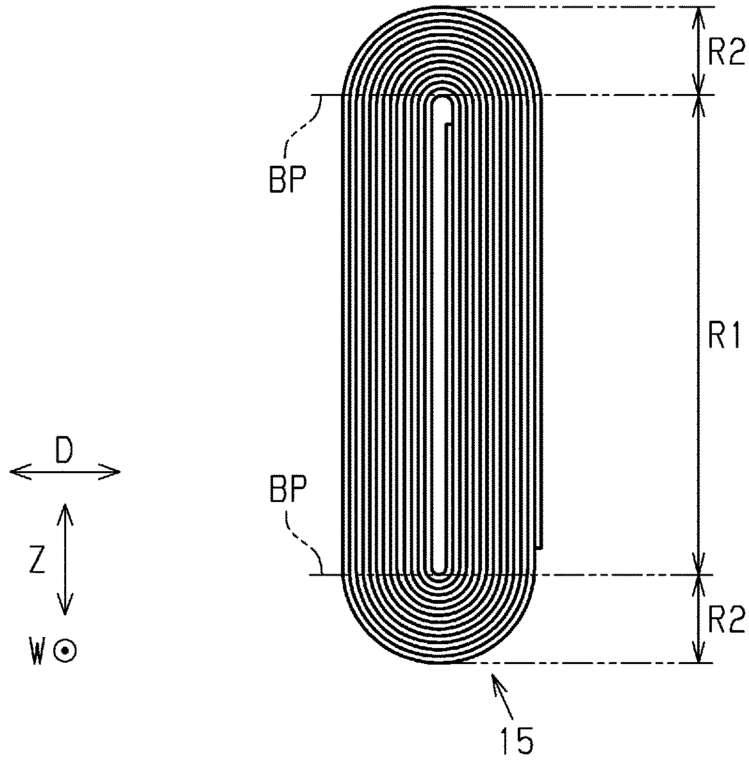
FIG. 3 is a schematic diagram showing the structure of an end of the electrode body as viewed in a width-wise direction W.

As shown in FIG. 3, the electrode body 15 is flat in the thickness-wise direction D. The electrode body 15 includes a flat surface region R1 and curved surface regions R2, which are regions in the longitudinal direction Z. The curved surface regions R2 are disposed on opposite ends of the flat surface region R1 in the longitudinal direction Z.

The flat surface region R1 has a flat surface in the thickness-wise direction D. Each of the curved surface regions R2 has a curved surface in the thickness-wise direction D. A greater tension is applied to the curved surface region R2 than the flat surface region R1 in the circumferential direction of the electrode body 15. In particular, tension is applied to a boundary position BP, which is the boundary between the flat surface region R1 and each curved surface region R2, in the circumferential direction of the electrode body 15. In other words, tension is applied to the boundary position BP in the longitudinal direction Z of the electrode body 15.

Distance of End of Electrode Body 15

Figure 4:
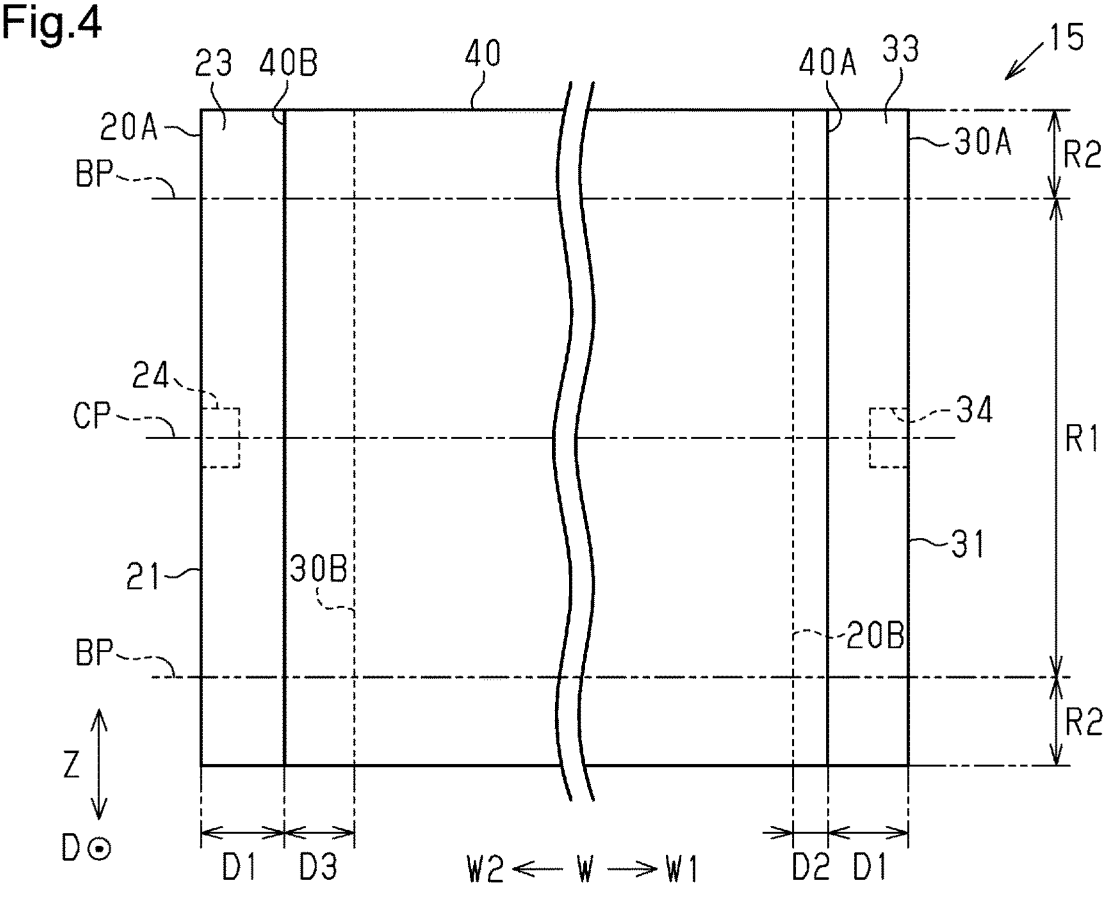
FIG. 4 is a schematic diagram showing the structure of the electrode body as viewed in a thickness-wise direction D.

As shown in FIG. 4, the electrode body 15 is configured so that the first distal end 30A of the positive plate 30 is separated from a first distal end 40A of the separator 40 in the first width-wise direction W1 by a distance D1. The first distal end 40A of the separator 40 is the end of the separator 40 in the first width-wise direction W1. Thus, the positive plate 30 is disposed to be longer than the separator 40 by the distance D1 in the first width-wise direction W1.

The electrode body 15 is configured so that a second distal end 20B of the negative plate 20 is separated from the first distal end 40A of the separator 40 in the second width-wise direction W2 by a distance D2. The second distal end 20B of the negative plate 20 is the end of the negative plate 20 in the first width-wise direction W1. Thus, the negative plate 20 is disposed to be shorter than the separator 40 by the distance D2 in the first width-wise direction W1. In other words, the positive plate 30 is disposed to be longer than the negative plate 20 in the first width-wise direction W1 by a distance corresponding to the sum of the distance D1 and the distance D2.

The electrode body 15 is configured so that the first distal end 20A of the negative plate 20 is separated from a second distal end 40B of the separator 40 in the second width-wise direction W2 by the distance D1. The second distal end 40B of the separator 40 is the end of the separator 40 in the second width-wise direction W2. Thus, the negative plate 20 is disposed to be longer than the separator 40 by the distance D1 in the second width-wise direction W2.

The electrode body 15 is configured so that a second distal end 30B of the positive plate 30 is separated from the second distal end 40B of the separator 40 in the first width-wise direction W1 by a distance D3. The second distal end 30B of the positive plate 30 is the end of the positive plate 30 in the second width-wise direction W2. Thus, the positive plate 30 is disposed to be shorter than the separator 40 by the distance D3 in the second width-wise direction W2. In other words, the negative plate 20 is disposed to be longer than the positive plate 30 in the second width-wise direction W2 by a distance corresponding to the sum of the distance D1 and the distance D3.

In the present embodiment, the distance D3 is greater than the distance D2. Therefore, the distance between the first distal end 30A of the positive plate 30 and the second distal end 20B of the negative plate 20 is less than the distance between the first distal end 20A of the negative plate 20 and the second distal end 30B of the positive plate 30.

Connection Region of Electrode Body 15

The electrode body 15 includes a negative connection region 24. The negative connection region 24 is connected to the negative current collector 16. The negative connection region 24 is located at the end of the negative connector 23 in the second width-wise direction W2. The negative connection region 24 is located in the flat surface region R1 in the longitudinal direction Z. More specifically, the negative connection region 24 is located at a connection position CP of the electrode body 15 in the longitudinal direction Z. That is, the connection position CP is a position extending from the negative connection region 24 in the width-wise direction W. The connection position CP may be located in the center of the electrode body 15 in the longitudinal direction Z or may be located at a position other than the center of the electrode body 15 in the longitudinal direction Z.

The electrode body 15 is rolled in the longitudinal direction Z so that multiple layers of the positive connector 33 are stacked at the end in the first width-wise direction W1. In the electrode body 15, the positive connector 33 is configured to be bent toward the center in the thickness-wise direction D so that a positive connection region 34 is connected to the positive current collector 17. Thus, the positive connector 33 receives tension toward the center in the thickness-wise direction D.

The electrode body 15 includes the positive connection region 34. The positive connection region 34 is connected to the positive current collector 17. The positive connection region 34 is located at the end of the positive connector 33 in the first width-wise direction W1. The positive connection region 34 is located in the flat surface region R1 in the longitudinal direction Z. More specifically, the positive connection region 34 is located at the connection position CP. That is, the connection position CP is a position extending from the positive connection region 34 in the width-wise direction.

The electrode body 15 is rolled in the longitudinal direction Z so that multiple layers of the negative connector 23 are stacked at the end in the second width-wise direction W2. In the electrode body 15, the negative connector 23 is configured to be bent toward the center in the thickness-wise direction D so that the negative connection region 24 is connected to the negative current collector 16. Thus, the negative connector 23 receives tension toward the center in the thickness-wise direction D.

Structure of End of Electrode Body 15 in First Width-Wise Direction W

Figure 5:
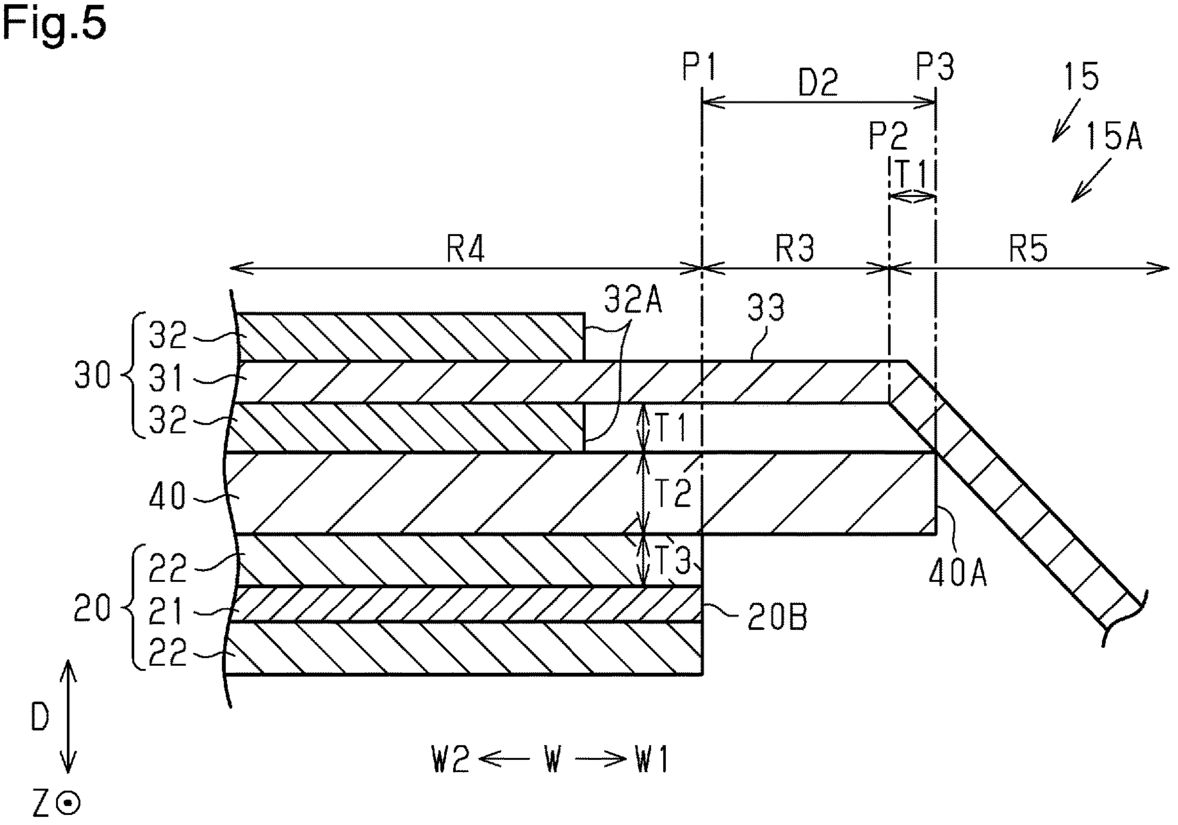
FIG. 5 is a cross-sectional diagram showing the structure of the electrode body at a boundary position as viewed in a longitudinal direction Z.
Figure 6:
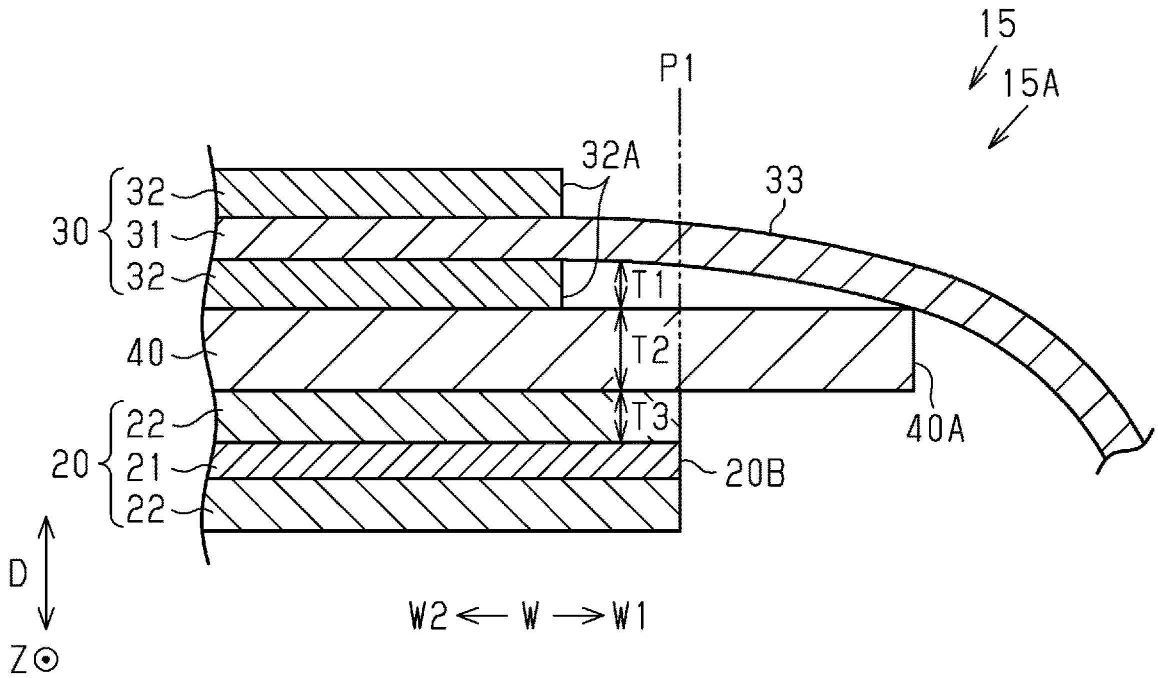
FIG. 6 is a cross-sectional diagram showing the structure of the electrode body at a connection position as viewed in the longitudinal direction Z.

The structure of the end of the electrode body 15 in the first width-wise direction W1 will now be described with reference to FIGS. 5 and 6. The structure of the boundary position BP will be described with reference to FIG. 5. The structure of the connection position CP will be described with reference to FIG. 6. To facilitate understanding of the invention, FIGS. 5 and 6 show a representative structure that includes a layer of the negative plate 20, a layer of the positive plate 30, a layer of the separator 40. The remaining structure is not shown.

Structure of Electrode Body 15 at Boundary Position BP

As shown in FIG. 5, in the electrode body 15, the negative plate 20 and the positive plate 30 are stacked so as to sandwich the separator 40. In the positive plate 30, the positive mixture layers 32 having a thickness T1 are formed on the two surfaces of the positive substrate 31. That is, the thickness T1 refers to the thickness of the positive mixture layer 32 disposed on a surface of the positive substrate 31.

The positive mixture layer 32 includes a distal end 32A in the first width-wise direction W1. The separator 40 projects beyond the distal end 32A in the first width-wise direction W1. The separator 40 projects beyond the second distal end 20B of the negative plate 20 by the distance D2 in the first width-wise direction W1. That is, the first distal end 40A of the separator 40 projects beyond the second distal end 20B of the negative plate 20. The separator 40 has a thickness T2.

In the negative plate 20, the negative mixture layers 22 having a thickness T3 are formed on the two surfaces of the negative substrate 21. That is, the thickness T3 refers to the thickness of the negative mixture layer 22 disposed on a surface of the negative substrate 21. In the negative plate 20, the negative mixture layers 22 are formed on the two surfaces of the negative substrate 21 up to the second distal end 20B. However, the negative mixture layers 22 do not have to be formed on the two surfaces of the negative substrate 21 up to the second distal end 20B. The second distal end 20B of the negative plate 20 projects in the first width-wise direction W1 beyond the distal end 32A of the positive mixture layer 32 in the first width-wise direction W1.

At the boundary position BP, at the end of the electrode body 15 in the first width-wise direction W1, the positive substrate 31 is bent at an acute angle in a bending region R3. More specifically, at the boundary position BP, the positive connector 33 is bent at an acute angle in the thickness-wise direction D at the end of the electrode body 15 in the first width-wise direction W1 in the bending region R3.

The bending region R3 is disposed between a first position P1 and a second position P2. The first position P1 is a position at which the second distal end 20B of the negative plate 20 is disposed in the first width-wise direction W1. The second position P2 is a position separated from a third position P3 by the thickness T1 in the second width-wise direction W2. The third position P3 is a position at which the first distal end 40A of the separator 40 is disposed in the first width-wise direction W1.

At the boundary position BP, the positive substrate 31 is not bent at an acute angle in a center region R4, which is located at a side of the bending region R3 in the second width-wise direction W2. At the boundary position BP, the positive substrate 31 is not bent at an acute angle in an end region R5, which is located at a side of the bending region R3 in the first width-wise direction W1.

Structure of Electrode Body 15 at Connection Position CP

As shown in FIG. 6, at the connection position CP, the electrode body 15 is configured so that the positive substrate 31 is curved at the first distal end 15A. More specifically, at the connection position CP, the positive connector 33 is curved in the thickness-wise direction D at the end of the electrode body 15 in the first width-wise direction W1. The positive substrate 31 is curved from the distal end 32A of the positive mixture layer 32 in the first width-wise direction W1. That is, the positive substrate 31 is curved from a position separated from the first position P1 in the second width-wise direction W2.

In the present embodiment, at the boundary position BP and the connection position CP, the electrode body 15 is configured so that the negative substrate 21 is curved at the end in the second width-wise direction W2 in the same manner as the end in the first width-wise direction W1 at the connection position CP. In other words, at the boundary position BP and the connection position CP, the negative connector 23 is curved in the thickness-wise direction D at the end of the electrode body 15 in the second width-wise direction W2.

Manufacturing Process of Lithium-Ion Rechargeable Battery 10

The overview of a manufacturing process of the lithium-ion rechargeable battery 10 in the present embodiment will now be described.

In the present embodiment, a source step is performed. The source step refers to a step for manufacturing battery elements of the lithium-ion rechargeable battery 10. Specifically, the source step is for manufacturing the negative plate 20 and the positive plate 30, which include the battery components of the lithium-ion rechargeable battery 10.

After the source step is completed, a stacking step is performed. In the stacking step, the negative plate 20, the positive plate 30, and the separator 40 are stacked in the order of the negative plate 20, the separator 40, the positive plate 30, and the separator 40. Thus, in the electrode body 15, the negative plate 20 and the positive plate 30 are stacked with the separator 40 disposed between the negative plate 20 and the positive plate 30. The negative mixture layer 22 and the positive mixture layer 32 are disposed to face each other via the separator 40. The negative plate 20 and the separator 40 are disposed so that the negative connector 23 projects from the separator 40 at the end of the electrode body 15 in the second width-wise direction W2. The positive plate 30 and the separator 40 are disposed so that the positive connector 33 projects from the separator 40 at the end of the electrode body 15 in the first width-wise direction W1. That is, the electrode body 15 includes the negative connector 23, which the negative substrate 21 is exposed from, in the second width-wise direction W2 and the positive connector 33, which the positive substrate 31 is exposed from, in the first width-wise direction W1.

After the stacking step is completed, a rolling step is performed. In the rolling step, the electrode body 15 supported and rolled about a roll axis extending in the width-wise direction W. The electrode body 15, which has an athletic-track-shaped contour, and includes a flat portion and curved portions disposed at opposite ends of the flat portion.

After the rolling step is completed, a rolled body pressing step is performed. The electrode body 15 is pressed and compressed by a force that does not exceed a predetermined pressure in the thickness-wise direction D. In the present embodiment, the predetermined pressure is 100 kN but is not limited to 100 kN.

More specifically, when the negative plate 20 and the positive plate 30 are stacked with the separator 40 located between the negative plate 20 and the positive plate 30, the electrode body 15 is supported and rolled about the rolling axis in the longitudinal direction Z. When pressure is applied in the thickness-wise direction D, which is orthogonal to the width-wise direction W, the electrode body 15 is shaped to have an end that is flat and athletic-track-shaped as viewed in the width-wise direction W.

After the rolled body pressing step is completed, a terminal welding step is performed. In the terminal welding step, the stacked layers of the negative connector 23 are gathered. The gathered layers of the negative connector 23 are electrically and mechanically connected to the negative current collector 16 by welding in the negative connection region 24. The stacked layers of the positive connector 33 are gathered. The gathered layers of the positive connector 33 are electrically and mechanically connected to the positive current collector 17 by welding in the positive connection region 34.

In particular, in the boundary position BP, the multiple layers of the positive substrate 31, which are the multiple layers of the positive connector 33, are bent at an acute angle toward the center of the electrode body 15 in the thickness-wise direction D in the bending region R3. In the connection position CP, the multiple layers of the positive substrate 31, which are the multiple layers of the positive connector 33, are curved toward the center of the electrode body 15 in the thickness-wise direction D. At the boundary position BP and the connection position CP, the multiple layers of the negative substrate 21, which are the multiple layers of the negative connector 23, are bent to be curved toward the center of the electrode body 15 in the thickness-wise direction D. The shapes of the boundary position BP and the connection position CP may be adjusted by changing positions that are connected to the negative current collector 16 and the positive current collector 17 in the width-wise direction or by inserting a shape-retaining jig between the electrode plates of the electrode body 15.

After the terminal welding step is completed, a case insertion step is performed. In the case insertion step, when the electrode body 15 is rolled and flattened and connected to the negative current collector 16 and the positive current collector 17, the electrode body 15 is inserted into the battery case 11.

After the case insertion step is completed, a case welding step is performed. In the case welding step, the battery case 11 is sealed with the lid 12 by laser beam welding or the like. At this stage, the nonaqueous electrolyte 18 is not added, and the liquid inlet of the lid 12 is open.

After the case welding step is completed, the cell drying step is performed. In the cell drying step, the temperature of the battery is increased to, for example, approximately 105° C. so that moisture and the like present in the battery case are sufficiently dried. In this step, the resin of the separator 40 is softened due to the high temperature. Hence, the restraining is not performed.

After the cell drying step is completed, a liquid addition and sealing step is performed. In the liquid addition and sealing step, the nonaqueous electrolyte 18 is added from the liquid inlet of the lid 12 into the battery container. When the liquid addition is completed, the liquid inlet is sealed. This completes the assembly of the lithium-ion rechargeable battery 10.

Operation of Present Embodiment

The operation of the present embodiment will now be described.

As shown in FIG. 5, at the boundary position BP, the positive substrate 31 is bent at an acute angle in the bending region R3. At the boundary position BP, the positive substrate 31 is not bent at an acute angle in a center region R4, which is located at a side of the bending region R3 in the second width-wise direction W2. At the boundary position BP, the positive substrate 31 is not bent at an acute angle in the end region R5, which is located at a side of the bending region R3 in the first width-wise direction W1.

Thus, at the boundary position BP, although tension is applied to the electrode body 15 in the circumferential direction of the electrode body 15, pressing force from the positive substrate 31 toward the separator 40 is reduced in the center region R4. Accordingly, pressing force from the separator 40 toward the negative plate 20 is reduced. This limits damage to the separator 40.

At the boundary position BP, the positive substrate 31 is bent at an acute angle in the bending region R3. Thus, the first distal end 40A of the separator 40 is held by the upper layer and the lower layer of the positive substrate 31. This inhibits heat shrink of the separator 40 even after the electrode body 15 is heated in the cell drying step or a post-manufacturing inspection step.

On the other hand, as shown in FIG. 6, at the connection position CP, the positive substrate 31 is curved to be arc-shaped. Tension applied to the connection position CP in the longitudinal direction Z is less than or equal to that applied to the boundary position BP. This limits damage to the separator 40 without reducing the pressing force applied from the positive substrate 31 to the separator 40.

At the connection position CP, the positive substrate 31 is curved to be arc-shaped. This widens the gap between the separator 40 and the negative plate 20 and the gap between the separator 40 and the positive plate 30. Thus, a sufficient amount of the nonaqueous electrolyte 18 is retained in the gap between the separator 40 and the negative plate 20 and the gap between the separator 40 and the positive plate 30. In particular, at the connection position CP, the welding of the positive substrate 31 to the positive current collector 17 hinders permeation of the nonaqueous electrolyte 18. In this regard, as described above, the positive substrate 31 is curved to be arc-shaped so that a sufficient amount of the nonaqueous electrolyte 18 is retained. This avoids deficiency of the nonaqueous electrolyte 18.

At the connection position CP, the positive substrate 31 is curved from the distal end 32A. More specifically, at the connection position CP, the positive substrate 31 is curved from a position separated from the first position P1 in the second width-wise direction W2. At the connection position CP, the positive substrate 31 needs to have a certain length so as to be welded to the positive current collector 17. As described above, the positive substrate 31 is curved from a position separated from the first position P1 in the second width-wise direction W2. This ensures the length of the positive substrate 31 so as to be welded to the positive current collector 17.

At the boundary position BP and the connection position CP, the negative substrate 21 is curved to be arc-shaped. The distance between the first distal end 20A of the negative plate 20 and the second distal end 30B of the positive plate 30 is greater than the distance between the first distal end 30A of the positive plate 30 and the second distal end 20B of the negative plate 20. Thus, the positive plate 30 is not disposed in a region in which the negative substrate 21 is curved. With this structure, when the negative substrate 21 is curved, the separator 40 is not held by the negative substrate 21 and the positive plate 30.

At the boundary position BP, although tension is applied to the electrode body 15 in the circumferential direction of the electrode body 15, damage to the separator 40 is limited even without reducing pressing force from the negative substrate 21 to the separator 40.

Effect of Present Embodiment

The effect of the present embodiment will now be described.

(1) In the present embodiment of the lithium-ion rechargeable battery 10, the positive connector 33 is configured to be bent at an acute angle in the thickness-wise direction D in the bending region R3 at the boundary position BP between the flat surface region R1 and the curved surface region R2 in the longitudinal direction Z. The bending region R3 is disposed between the first position P1 and the second position P2. The first position P1 is a position at which the second distal end 20B of the negative plate 20 is disposed. The second position P2 is a position separated from the third position P3, at which the first distal end 40A of the separator 40 is disposed, by the thickness T1 of the positive mixture layer 32 in the second width-wise direction W2. With this structure, the separator 40 is not held by the positive plate 30 and the negative plate 20 in the bending region R3. At the boundary position BP, the positive plate 30 is bent in the bending region R3. This limits damage to the separator 40 even when tension is applied by the rolling of the electrode body 15 in the longitudinal direction Z and tension is applied to the positive plate 30 in the thickness-wise direction D.

(2) In addition, at the boundary position BP, the positive substrate 31 is bent at an acute angle in the bending region R3 so that the first distal end 40A of the separator 40 is held by the layers of the positive substrate 31. This inhibits heat shrink of the separator 40 even after the electrode body 15 is heated.

(3) At the connection position CP, the positive connector 33 is configured to be curved. Tension applied by the rolling of the electrode body 15 to the connection position CP in the longitudinal direction Z is less than or equal to that applied to the boundary position BP. Thus, at the connection position CP, damage to the separator 40 is limited even when the positive plate 30 is curved, which applies tension to the positive plate 30 in the thickness-wise direction D. In addition, a sufficient amount of the nonaqueous electrolyte 18 is retained in the gap between the separator 40 and the negative plate 20 and the gap between the separator 40 and the positive plate 30.

(4) At the boundary position BP and the connection position CP, the negative connector 23 is configured to be curved. The distance between the first distal end 20A of the negative plate 20 and the second distal end 30B of the positive plate 30 is greater than the distance between the first distal end 30A of the positive plate 30 and the second distal end 20B of the negative plate 20. That is, the positive plate 30 is not disposed in a region in which the negative substrate 21 is curved. Thus, at the boundary position BP and the connection position CP, damage to the separator 40 is limited even when the negative plate 20 is curved, which applies tension to the negative plate 20 in the thickness-wise direction D. In addition, a sufficient amount of the nonaqueous electrolyte 18 is retained in the gap between the separator 40 and the negative plate 20 and the gap between the separator 40 and the positive plate 30.

Second Embodiment

A second embodiment will now be described below.

In the first embodiment, at the boundary position BP, the electrode body 15 is configured so that the positive substrate 31 is bent at an acute angle in the bending region R3. In the second embodiment, at the boundary position BP, the electrode body 15 may be configured so that the positive substrate 31 is bent at an acute angle in a bending region R6. In the description below, the same reference numerals are given to those components that are the same as the corresponding components of the above embodiment. Such elements will not be described or will be briefly described.

Figure 7:
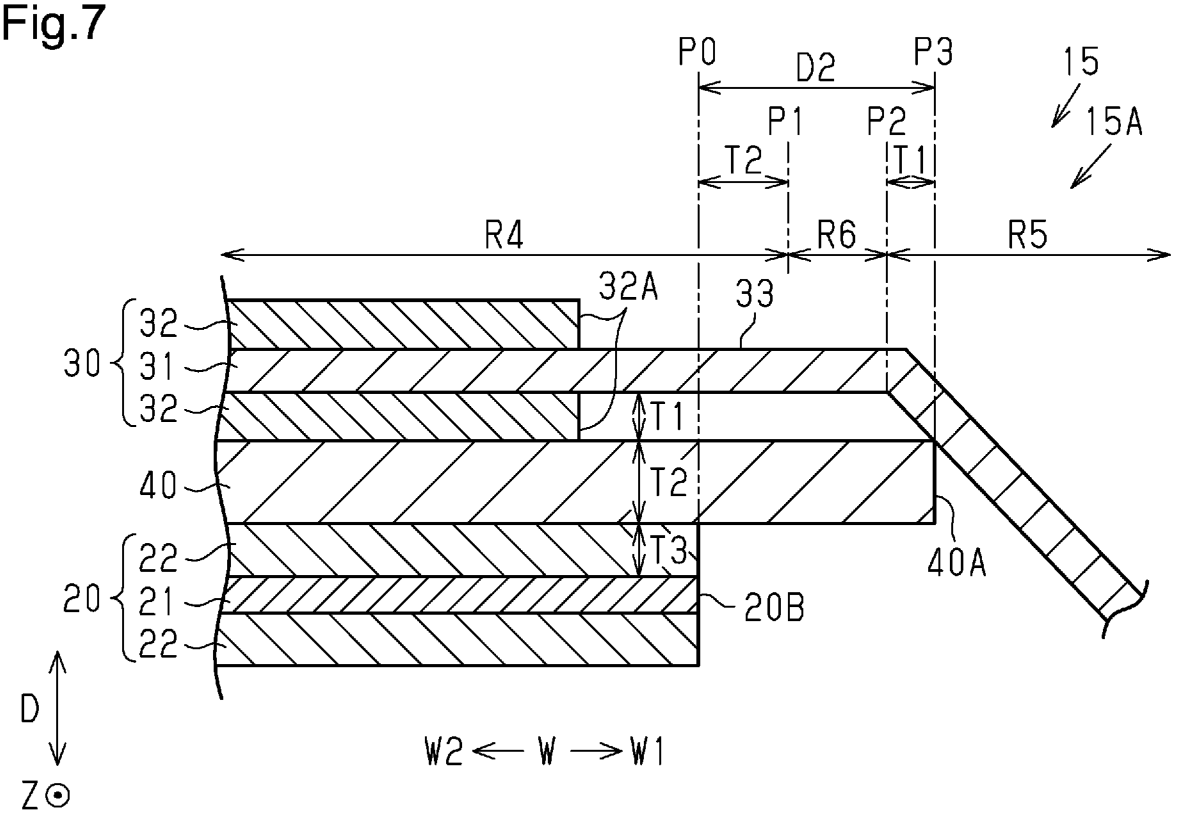
FIG. 7 is a cross-sectional diagram showing the structure of the electrode body at a boundary position as viewed in a longitudinal direction Z.

As shown in FIG. 7, at the boundary position BP, the electrode body 15 is configured so that the positive substrate 31 is bent at an acute angle in the bending region R6. The bending region R6 is disposed between a first position P1 and a second position P2. In the second embodiment, the first position P1 is separated from a reference position P0 in the first width-wise direction W1 by an amount corresponding to the thickness T2 of the separator 40. The reference position P0 is a position at which the second distal end 20B of the negative plate 20 is disposed, which is the same as the first position P1 of the first embodiment. In the second embodiment, the first position P1 may be a position separated from the reference position P0, at which the second distal end 20B of the negative plate 20 is disposed, by an amount corresponding to the thickness T2 of the separator 40 in the first width-wise direction W1.

Operation of Second Embodiment

The operation of the second embodiment will now be described.

At the boundary position BP, the positive substrate 31 is bent at an acute angle in the bending region R6. At the boundary position BP, the positive substrate 31 is not bent at an acute angle in the center region R4, which is located at a side of the bending region R6 in the second width-wise direction W2. In particular, the positive substrate 31 is not bent at an acute angle between the reference position P0 and the first position P1 in the center region R4. This further limits damage to the separator 40.

Effect of Second Embodiment

The effect of the second embodiment will now be described.

(5) In the lithium-ion rechargeable battery 10 of the present embodiment, the first position P1 is a position separated from the reference position P0, at which the second distal end 20B of the negative plate 20 is disposed, by an amount corresponding to the thickness T2 of the separator 40 in the first width-wise direction W1. With this structure, the separator 40 is not held by the positive plate 30 and the negative plate 20 in the bending region R6. At the boundary position BP, the positive plate 30 is bent in the bending region R6. This limits damage to the separator 40 even when tension is applied by the rolling of the electrode body 15 in the longitudinal direction Z and tension is applied to the positive plate 30 in the thickness-wise direction D.

Modified Examples

The embodiments described above may be modified as follows. The embodiments and the following modified examples can be combined within a range where the combined modified examples remain technically consistent with each other.

In the embodiments, for example, at the boundary position BP, the positive substrate 31 may be curved in the center region R4 and the end region R5 if the positive substrate 31 is not bent at an acute angle.

In the embodiments, for example, the positive plate 30 may be configured at the boundary position BP so that an insulation layer is stacked in the center region R4 and is not stacked in the bending regions R3 and R6 and the end region R5. An insulation layer may be stacked in the center region R4 so that the positive substrate 31 is configured not to be bent at an acute angle in the center region R4 and configured to be bent at an acute angle in the bending regions R3 and R6.

In the embodiments, for example, the electrode body 15 may be configured so that the positive substrate 31 is bent at an acute angle in the bending regions R3 and R6 and then curved at the boundary position BP. For example, the electrode body 15 may be configured so that the positive substrate 31 is bent at an acute angle in the bending regions R3 and R6 at the boundary position BP by pressing a predetermined position of the positive connector 33 with a predetermined pressure.

In the embodiments, for example, the positive substrate 31 may be bent at an acute angle in the bending regions R3 and R6 on at least one of the two boundary positions BP. More specifically, the positive substrate 31 may be bent at an acute angle in the bending regions R3 and R6 on at least one of the boundary position BP that is located closer to the positive external terminal 14 and the boundary position BP that is located farther from the positive external terminal 14. The boundary position BP located closer to the positive external terminal 14 may be referred to as a position to which the positive current collector 17 extends. The boundary position BP located farther from the positive external terminal 14 may be referred to as a position to which the positive current collector 17 does not extend.

In the embodiments, the present disclosure is described using the lithium-ion rechargeable battery 10. However, the present disclosure may be applicable to other rechargeable batteries.

In the embodiments, the lithium-ion rechargeable battery 10 is flat and slim and is for a vehicle on-board use. The present disclosure is also applicable to a cylindrical battery or the like. Further, the present disclosure is applicable to a battery for the use with a ship or an aircraft and a stationary battery in addition to a vehicle on-board battery.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The present disclosure includes the following embodiments. To facilitate understanding, the reference signs of some of the components of the embodiments are provided with no intention to limit. In the following embodiments, some of the elements may be omitted or may be selected or extracted to be combined with each other.

Clause 1

A rechargeable battery (10) according to one or more of the embodiments in the present disclosure, including:

an electrode body (15) including a positive plate (30), a negative plate (20), and a separator (40) disposed between the negative plate and the positive plate, in which the positive plate includes a positive substrate and positive mixture layers (32) disposed on two opposite surfaces of the positive substrate, the electrode body is a flat rolled electrode body in which the positive plate, the negative plate, and the separator are stacked and rolled about a rolling axis (parallel to W), the electrode body includes two curved portions (R2) including a curved outer surface and a flat portion (R1) that joins the two curved portions and includes a flat outer surface, the positive plate includes an end located at a side of the electrode body in a rolling axial direction and a positive connector (33) disposed at the end of the positive plate, in the positive connector (33), the two opposite surfaces of the positive substrate are free of the positive mixture layers, each of the negative plate and the separator includes a distal end (20B, 40A) located at the same side as the end of the positive plate in the rolling axial direction of the electrode body, the distal end of the separator projects toward an outer side of the electrode body beyond the distal end of the negative plate in the rolling axial direction of the electrode body, at least a portion of the positive connector does not face the negative plate in the stacking direction of the electrode body, the positive connector includes a positive connection region (34) connected to a positive current collector (17), the positive connection region (34) is located at a portion of the positive connector in the flat portion, the positive connector is bent at an acute angle with respect to the rolling axis of the electrode body toward a center in a stacking direction of the electrode body in a region between a first position (P1) and a second position (P2) on a boundary (BP) between the flat portion and the curved portion, the first position is a position at which the distal end of the negative plate is located, and the second position is a position separated from a position of the distal end of the separator in the rolling axial direction of the electrode body in a direction away from the end of the positive plate by an amount corresponding to a thickness of the positive mixture layer disposed on a surface of the positive substrate.

Clause 2

In some of the embodiments of the present disclosure, the first position may be a position separated from the distal end of the negative plate toward the end of the positive plate in the rolling axial direction of the electrode body by an amount corresponding to a thickness of the separator.

Clause 3

In some of the embodiments of the present disclosure, the rechargeable battery may include a nonaqueous electrolyte (18); and a battery case (11) that accommodates the electrode body and the nonaqueous electrolyte, in which the positive connector may be curved toward a center in the stacking direction of the electrode body with respect to the rolling axis of the electrode body in the rolling axial direction of the electrode body at a connection position (CP) extending from the positive connection region in the width-wise direction.

What is claimed is:

1. A rechargeable battery, comprising:

an electrode body including a positive plate, a negative plate, and a separator disposed between the negative plate and the positive plate, wherein the positive plate includes a positive substrate and positive mixture layers disposed on two opposite surfaces of the positive substrate, the electrode body is a flat rolled electrode body in which the positive plate, the negative plate, and the separator are stacked in a stacking direction and rolled in a rolling direction that intersects the stacking direction and includes a flat surface region including a flat surface and a curved surface region including a curved surface, the positive plate includes a positive connector extending from the positive substrate in a first width-wise direction that intersects the stacking direction and the rolling direction, the positive connector being free of the positive mixture layers on the two opposite surfaces of the positive connector, the electrode body is configured so that at least a portion of the positive connector does not face the negative plate, a distal end of the separator projects beyond a distal end of the negative plate, and the flat surface region includes a positive connection region in which the positive connector is connected to a positive current collector, the positive connector is configured to be bent at an acute angle in the stacking direction in a region between a first position and a second position on a boundary position between the flat surface region and the curved surface region, the first position refers to a position at which the distal end of the negative plate is located, and the second position refers to a position separated, in a second width-wise direction that is opposite to the first width-wise direction, from a position at which the distal end of the separator is located by an amount corresponding to a thickness of the positive mixture layer disposed on a surface of the positive substrate.

2. The rechargeable battery according to claim 1, comprising:

a nonaqueous electrolyte; and a battery case that accommodates the electrode body and the nonaqueous electrolyte, wherein the positive connector includes;

the boundary position between the flat surface region and the curved surface region; and a connection position extending from the positive connection region in the second width-wise direction, and the connection position of the positive connector is curved in the stacking direction.

3. A rechargeable battery, comprising:

an electrode body including a positive plate, a negative plate, and a separator disposed between the negative plate and the positive plate, wherein the positive plate includes a positive substrate and positive mixture layers disposed on two opposite surfaces of the positive substrate, the electrode body is a flat rolled electrode body in which the positive plate, the negative plate, and the separator are stacked in a stacking direction and rolled in a rolling direction that intersects the stacking direction and includes a flat surface region including a flat surface and a curved surface region including a curved surface, the positive plate includes a positive connector extending from the positive substrate in a first width-wise direction that intersects the stacking direction and the rolling direction, the positive connector being free of the positive mixture layers on the two opposite surfaces of the positive connector, the electrode body is configured so that at least a portion of the positive connector does not face the negative plate, a distal end of the separator projects beyond a distal end of the negative plate, and the flat surface region includes a positive connection region in which the positive connector is connected to a positive current collector, the positive connector is configured to be bent at an acute angle in the stacking direction in a region between a first position and a second position on a boundary position between the flat surface region and the curved surface region, the first position refers to a position separated, in the first width-wise direction, from a position at which the distal end of the negative plate is located by an amount corresponding to a thickness of the separator, and the second position refers to a position separated, in a second width-wise direction that is opposite to the first width-wise direction, from a position at which the distal end of the separator is located by an amount corresponding to a thickness of the positive mixture layer disposed on a surface of the positive substrate.

4. The rechargeable battery according to claim 3, comprising:

a nonaqueous electrolyte, and a battery case that accommodates the electrode body and the nonaqueous electrolyte, wherein the positive connector includes:

the boundary position between the flat surface region and the curved surface region; and a connection position extending from the positive connection region in the second width-wise direction, and the connection position of the positive connector is curved in the stacking direction.

* * * * *